(12) United States Patent
Cho et al.

(10) Patent No.: US 11,182,886 B2
(45) Date of Patent: Nov. 23, 2021

(54) METHOD AND APPARATUS FOR IMAGE PREPROCESSING

(71) Applicant: Electronics and Telecommunications Research Institute, Daejeon (KR)

(72) Inventors: Yong Ju Cho, Daejeon (KR); Soon Heung Jung, Daejeon (KR); Jeong Il Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/882,089

(22) Filed: May 22, 2020

(65) Prior Publication Data

US 2020/0372620 A1 Nov. 26, 2020

(30) Foreign Application Priority Data

May 24, 2019 (KR) .......................... 10-2019-0061356

(51) Int. Cl.
*G06T 7/00* (2017.01)
*G06T 5/40* (2006.01)
*G06T 5/00* (2006.01)

(52) U.S. Cl.
CPC .............. *G06T 5/40* (2013.01); *G06T 5/009* (2013.01); *G06T 7/97* (2017.01); *G06T 2207/10028* (2013.01)

(58) Field of Classification Search
CPC ... G06T 5/50; G06T 2207/10024; G06T 5/40; G06K 9/00288; G06K 9/00617; G06K 9/36
See application file for complete search history.

(56) References Cited

U.S. PATENT DOCUMENTS

| | | |
|---|---|---|
| 7,092,555 B2 | 8/2006 | Lee et al. |
| 8,208,716 B2 | 6/2012 | Choi et al. |
| 8,582,889 B2 | 11/2013 | Vaddadi et al. |
| 8,705,876 B2 | 4/2014 | Vaddadi et al. |

(Continued)

FOREIGN PATENT DOCUMENTS

| | | |
|---|---|---|
| KR | 101637229 B1 | 7/2016 |
| KR | 101772178 B1 | 8/2017 |

OTHER PUBLICATIONS

Y. Chang, C. Jung, P. Ke, H. Song and J. Hwang, "Automatic Contrast-Limited Adaptive Histogram Equalization With Dual Gamma Correction," in IEEE Access, vol. 6, pp. 11782-11792, 2018, doi: 10.1109/ACCESS.2018.2797872. (Year: 2018).*

(Continued)

*Primary Examiner* — Li Liu
(74) *Attorney, Agent, or Firm* — William Park & Associates Ltd.

(57) ABSTRACT

The present invention provides a method for image preprocessing, the method including: identifying a plurality of input images to process image registration; selecting at least one transformation method among histogram equalization and gamma transformation in consideration of hue and brightness values of the plurality of input images; processing the histogram equalization on the plurality of input images in response to the histogram equalization method being selected; and processing the gamma transformation on the plurality of input images, in response to the gamma transformation method being selected.

18 Claims, 18 Drawing Sheets

(56) References Cited

U.S. PATENT DOCUMENTS

2020/0250497 A1* 8/2020 Peng .................... G06K 9/6277

OTHER PUBLICATIONS

Veluchamy, Magudeeswaran, and Bharath Subramani. "Image contrast and color enhancement using adaptive gamma correction and histogram equalization." Optik 183 (2019): 329-337. (Year: 2019).*
Amiri, S. Asadi, and H. Hassanpour. "A preprocessing approach for image analysis using gamma correction." International Journal of Computer Applications 38.12 (2012): 38-46.*
Rahman, Shanto, et al. "An adaptive gamma correction for image enhancement." EURASIP Journal on Image and Video Processing 2016.1 (2016): 1-13.*
Muhammad Umer Kakli et al., "Impact of Image Pre-processing on Feature Correspondences", KSII Transactions on Internet and Information Systems vol. X, No. X, Dec. 201X.

* cited by examiner

FIG. 6

| input image | | the number of detected feature points | | performance improvement level (%) |
|---|---|---|---|---|
| types of input image | image size | original image | preprocessed image | |
| Bark | 765 × 512 | 34.6 | 64.2 | 185.5 |
| Bikes | 1000 × 700 | 218.2 | 265.0 | 121.4 |
| Boat | 850 × 680 | 99.8 | 193.2 | 193.6 |
| Bricks | 1000 × 700 | 293.3 | 767.8 | 261.8 |
| Cars | 921 × 614 | 129.5 | 554.3 | 428.0 |
| Graffitti | 800 × 640 | 89.0 | 113.5 | 127.5 |
| Trees | 1000 × 700 | 108.8 | 172.4 | 158.5 |
| UBC | 800 × 640 | 738.8 | 1329.2 | 179.9 |
| Yatch | 1920 × 1080 | 137.8 | 327.0 | 237.3 |
| Soccer | 1080 × 1920 | 205.0 | 588.8 | 287.2 |
| Expo | 1920 × 1080 | 48.3 | 130.5 | 270.2 |
| Concert | 1080 × 1920 | 33.0 | 85.5 | 259.1 |
| ETRI | 1080 × 1920 | 107.8 | 257.2 | 238.6 |
| ETRI Night | 1080 × 1920 | 61.8 | 182.5 | 295.3 |
| Lake Night | 1080 × 1920 | 16.7 | 66.2 | 396.4 |
| Lake | 1080 × 1920 | 21.5 | 91.7 | 426.5 |
| Baseball | 1080 × 1920 | 105.7 | 193.3 | 182.9 |
| SoccerNight | 1080 × 1920 | 163.5 | 493.8 | 302.0 |
| Concert 2 | 1080 × 1920 | 31.5 | 93.7 | 297.5 |
| Yeosu | 1920 × 1080 | 129.8 | 431.8 | 332.7 |
| Seoul 1 | 1920 × 1080 | 64.8 | 153.8 | 237.3 |
| Seoul 2 | 1920 × 1080 | 204.3 | 713.0 | 349.0 |
| Seoul 3 | 1920 × 1080 | 66.3 | 248.5 | 374.8 |
| Aquarium | 1920 × 1080 | 79.0 | 109.3 | 138.4 |
| NUST 1 | 4272 × 2848 | 83.5 | 139.5 | 167.1 |
| NUST 2 | 4272 × 2848 | 193.5 | 233.0 | 120.4 |
| Port | 4096 × 2160 | 543.5 | 625.5 | 115.1 |
| Bridge | 4096 × 2160 | 144.5 | 164.0 | 113.5 |
| Yuna | 4096 × 2160 | 100.5 | 193.0 | 192.0 |
| Frog | 640 × 480 | 45.0 | 86.0 | 191.1 |
| Hall | 2000 × 3008 | 168.5 | 800.0 | 474.8 |
| SouthBuilding | 3072 × 2304 | 2184.5 | 3930.5 | 179.9 |
| Gerrard Hall | 5882 × 3816 | 1095.0 | 1428.0 | 130.4 |
| Person Hall | 5616 × 3744 | 10849.0 | 16536.5 | 152.4 |
| GarahamHall | 5616 × 3744 | 1035.5 | 2601.0 | 251.2 |
| Average | − | 560.9 | 981.8 | 175.0 |

METHOD AND APPARATUS FOR IMAGE PREPROCESSING

CROSS REFERENCE TO RELATED APPLICATION

The present application claims priority to Korean Patent Application No. 10-2019-0061356, filed May 24, 2019, the entire contents of which is incorporated herein for all purposes by this reference.

BACKGROUND OF THE INVENTION

Field of the Invention

The present disclosure relates to a method and apparatus for image preprocessing and, more particularly, to a method and apparatus for preprocessing an image used for image registration.

Description of the Related Art

Recently, in the field of computer vision technology, research on technologies such as image synthesis, image registration, point cloud-based 3D reconstruction, etc. has been actively conducted.

In processing image synthesis, image registration, point cloud-based 3D reconstruction, etc., the feature points are first extracted from a plurality of original images, and then the aforementioned operations are processed on the basis of the extracted feature points. Accordingly, as more feature points are extracted, performance such as image synthesis, image registration, and point cloud-based 3D reconstruction may be improved.

However, since a physical or optical environment in which the plurality of original images is photographed is variously changed, it is not easy to accurately detect a plurality of feature points from the plurality of original images.

SUMMARY OF THE INVENTION

An object of the present disclosure is to provide a method and apparatus for constructing a preprocessed image in which a plurality of feature points can be detected in consideration of characteristics of an input image.

Technical problems to be achieved in the present disclosure are not limited to the above-mentioned technical problems, and other technical problems not mentioned above will be clearly understood by those skilled in the art from the following description.

According to an aspect of the present disclosure, a method for image preprocessing may be provided. The method includes identifying a plurality of input images to process image registration; selecting at least one transformation method among histogram equalization and gamma transformation in consideration of hue and brightness values of the plurality of input images; processing the histogram equalization on the plurality of input images, in response to the histogram equalization method being selected; and processing the gamma transformation on the plurality of input images, in response to the gamma transformation method being selected.

According to another aspect of the present disclosure, an apparatus for image preprocessing may be provided. The apparatus includes: a transformation method selection unit identifying a plurality of input images to process image registration, selecting at least one transformation method among histogram equalization and gamma transformation in consideration of hue and brightness values of the plurality of input images, and providing the selected at least one transformation method; a HE processing unit processing the histogram equalization on the plurality of input images, in response to the histogram equalization method being selected; and a gamma transformation processing unit processing the gamma transformation on the plurality of input images.

The features briefly summarized above with respect to the present disclosure are merely exemplary aspects of the detailed description of the present disclosure described below, and do not limit the scope of the present disclosure.

According to the present disclosure, a method and apparatus for image preprocessing may be provided so that a plurality of feature points may be accurately detected from different input images.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features, and other advantages of the present invention will be more clearly understood from the following detailed description when taken in conjunction with the accompanying drawings, in which:

FIG. 6 is a diagram illustrating an exemplary example and a comparative example of an image preprocessing method according to an embodiment of the present disclosure;

DETAILED DESCRIPTION OF THE INVENTION

Figure 1:
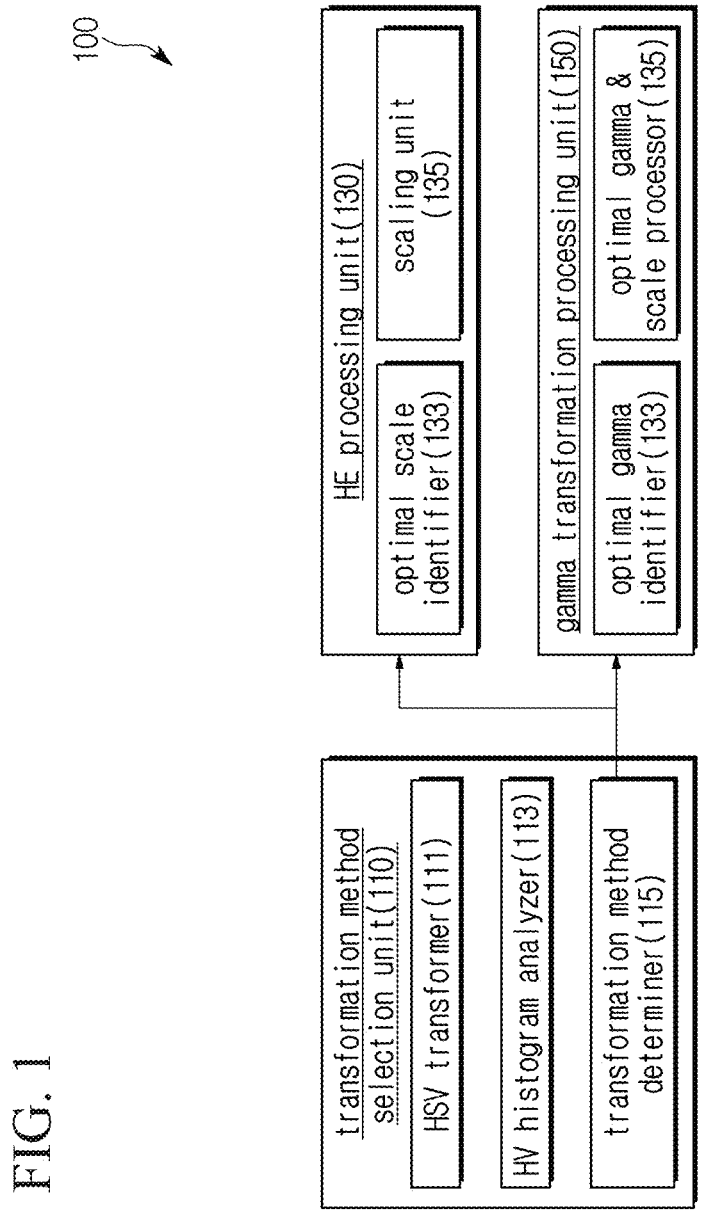
FIG. 1 is a block diagram illustrating a configuration of an image preprocessing apparatus according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, embodiments of the present disclosure will be described with reference to the accompanying drawings.

FIG. 1 is a block diagram illustrating a configuration of an image preprocessing apparatus according to an embodiment of the present disclosure.

Referring to FIG. 1, the image preprocessing apparatus 100 according to an embodiment of the present disclosure includes a transformation method selection unit 110, a HE processing unit 130, and a gamma transformation processing unit 150.

The image preprocessing apparatus 100 according to an embodiment of the present disclosure is an apparatus for preprocessing an image to significantly increase the performance of feature point detection of an image used for image registration. Accordingly, an image input into the image preprocessing apparatus 100 according to an embodiment of the present disclosure may include a reference image, an alignment image, and the like used for image registration, in which the reference image, the alignment image, and the like used for image registration will be collectively referred to as a plurality of input images.

The transformation method selection unit 110 may identify a plurality of input images to process image registration, and select at least one transformation method among histogram equalization and gamma transformation in consideration of hue and brightness values of the plurality of input images.

The transformation method selection unit 110 may identify a hue value, a brightness value, and the like of the input image, and determine a transformation method in consideration of the identified hue value or brightness value.

For example, the plurality of input images may include RGB model based color information, and the transformation method selection unit 110 may include an HSV transformer 111 for transforming an RGB image based input image into a HSV (Hue, Saturation, and Value) model.

In addition, the transformation method selection unit 110 may include an HV histogram analyzer 113 that analyzes a histogram for a hue value of the input image, a histogram for a brightness value, and the like, and a transformation method determiner 115 that determines the transformation method of the input image on the basis of the HV histogram provided by the HV histogram analyzer 113, In particular, the transformation method determiner 115 primarily estimates at least one transformation method on the basis of the hue histogram of the plurality of input images, and secondly determines the transformation method in consideration of the brightness histogram of the plurality of input images on the basis of the estimated at least one transformation method.

Specifically, the transformation method determiner 115 may determine the transformation method by performing an operation of the program code illustrated in Table 1 below. In Table 1, the transformation method determiner 115 illustrates determining the transformation method using two input images, that is, the first input image (Image 1) and the second input image (Image 2), but the present disclosure is not limited thereto, and the number of input images may be variously changed on the basis of an image registration method.

TABLE 1

| Definitions: | |
|---|---|
| $H_1$: | Histogram of H Component of Image 1 |
| $H_2$: | Histogram of H Component of Image 2 |
| $V_1$: | Histogram of V Component of Image 1 |
| $V_2$: | Histogram of V Component of Image 2 |
| $P\_H_1$: | Highest Peak of $H_1$ |
| $P\_H_2$: | Highest Peak of $H_2$ |
| $P\_V_1$: | Highest Peak of $V_1$ |
| $P\_V_2$: | Highest Peak of $V_2$ |

TABLE 1-continued

```
Output: HE or γ
Step I (Initial Guess):
if P_H₁ <= 140° and P_H₂ <= 140°
      Decision: γ
else
      Decision: HE
end
Step II (Final Decision):
if Decision == γ                                                    ]
    if (P_V₁ <= 0.3 and P_V₂ >= 0.7) OR ((P_V₁ >= 0.7 and P_V₂ <= 0.3)) ⊢ Intensity different
between
                    Decision = HE              | images  is very high.
                    end                        ]
      else Decision = HE                       ]
         if P_V₁ >= 0.7 and P_V₂ >= 0.7        ⊢ Images are very bright
                         Decision == γ         |
      end                                      ]
end
Output = Decision
```

Referring to Table 1, the transformation method determiner 115 first determines whether the hue values of the first input image Image 1 and the second input image Image 2 are both equal to or less than a predetermined threshold (e.g., 140°), and estimate a histogram equalization method when it is determined that the hue values of the first input image (Image 1) and the second input image (Image 2) are both equal to or less than the predetermined threshold (e.g., 140°). Meanwhile, when both the hue values of the first input image Image 1 and the second input image Image 2 are not less than or equal to the predetermined threshold (e.g., 140°), the transformation method determiner 115 may estimate a gamma transformation method as the transformation method. Thereafter, the transformation method determiner 115 may determine the transformation method by applying different brightness values of the first input image Image 1 and the second input image Image 2 on the basis of the estimated transformation method.

For example, in the case that the estimated transformation method is the gamma transformation method, the transformation method determiner 115 may determine the gamma transformation method or the histogram equalization method by identifying the brightness difference between the first input image Image 1 and the second input image Image 2.

As shown in Table 1, the transformation method determiner 115 preferably determines the histogram equalization method as the transformation method, when a brightness value of the first input image is less than or equal to a predetermined first brightness value (0.3), and a brightness value of the second input image is equal to or greater than a predetermined second brightness value (0.7), or the brightness value of the first input image is equal to or greater than the second predetermined brightness value (0.7), and the brightness value of the second input image is less than or equal to the predetermined first brightness value (0.3).

In the case that the estimated transformation method is the histogram equalization method, the transformation method determiner 115 preferably determines the transformation method as the gamma transformation method when the brightness values of the first input image and the second input image are equal to or greater than a predetermined threshold (e.g., 0.7).

In addition, the transformation method determiner 115 may provide the determined transformation method to the HE processing unit 130 or the gamma transformation processing unit 150.

The HE processing unit 130 may operate when the determined transformation method is the histogram equalization method, and may process histogram equalization for a plurality of input images.

Furthermore, the HE processing unit 130 may convert the plurality of input images undergoing the histogram equalization processing into various sizes, identify optimized size values from the input images converted into various sizes, and provide the same as preprocessed images. To this end, the HE processing unit 130 may include an HE processor 131 that performs histogram equalization processing for a plurality of input images; an optimal scale identifier 133 that identifies an optimal scale value by scaling the input images undergoing the histogram equalization processing into various sizes; and a scaler 135 that scales the input image by applying the determined optimal scale value.

Preferably, the optimal scale identifier 133 may identify an optimal scale value through calculation of Equation 1 below.

$$s^* = \underset{a<s<b}{\operatorname{argmax}} f(s(I_1^{HE}), s(I_2^{HE})) \qquad \text{[Equation 1]}$$

$I_1, I_2$: Input Images $I_1^{HE}, I_2^{HE}$: Input Image after HE $s(\ )$: Scaling Operator $a$ & $b$: Bounds for Scaling $f$: Feature Matching Function The gamma transformation processing unit 150 may operate when the determined transformation method is a gamma transformation method, and may perform gamma transformation on a plurality of input images. To this end, the gamma transformation processing unit 150 may include an optimal gamma identifier 151 that converts the gamma value into various values to correct the hue of the input image, scale the input image of the corrected gamma value to various sizes, and determines an optimized value from the input images scaled to various sizes.

Preferably, the optimal gamma identifier 151 may determine an optimal gamma value and scale value through calculation of Equation 2 below.

$$\underset{s,y}{\operatorname{argmax}}_{**} = \underset{c<y<d}{a<s<b} \quad \text{[Equation 2]}$$

$$f\left(s\left(255\times\left(\frac{I_1}{255.0}\right)^{\frac{1}{y}}\right), s\left(255\times\left(\frac{I_2}{255.0}\right)^{\frac{1}{y}}\right)\right)$$

$I_1, I_2$: Input Images $s(\ )$: Scaling Operator $a$ & $b$: Bounds for Scaling $c$ & $d$: Bounds for $y$ $f$: Feature Matching Function In addition, the gamma transformation processing unit 150 may include an optimal gamma & scale processor 153 that applies the optimal gamma value and scale value determined by the optimal gamma identifier 151 to the input image.

Figure 2:
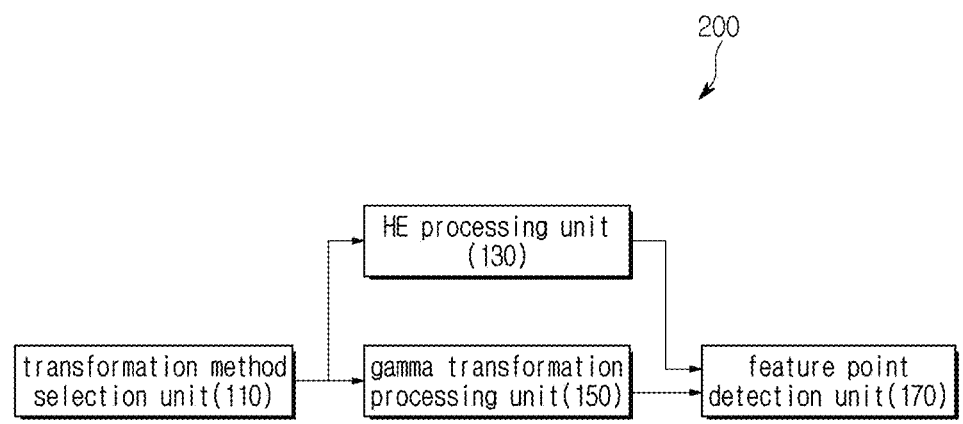
FIG. 2 is a block diagram showing a configuration of a feature point detection apparatus according to another embodiment of the present disclosure.

FIG. 2 is a block diagram showing a configuration of a feature point detection apparatus according to another embodiment of the present disclosure.

The feature point detecting apparatus 200 according to another embodiment of the present disclosure includes the transformation method selection unit 110, the HE processing unit 130, and the gamma transformation processing unit 150 provided in the image preprocessing apparatus 100 described above and may further include a feature point detection unit 170.

The transformation method selection unit 110, the HE processing unit 130, the gamma transformation processing unit 150, and the like are configured in the same manner as the image preprocessing apparatus 100, as described above referring to FIG. 1.

The feature point detection unit 170 detects a feature point from a plurality of input images, for example, a reference image alignment image, and the like used for image registration. When configuring a panoramic image, a 360 image, and a point cloud-based 3D image, various feature point detection may be used, in which the feature point detection unit 170 may perform feature point detection on the basis of such various methods. For example, the feature point detection unit 170 may perform feature point detection on the basis of algorithms, such as speed-up robust features (SURF), scale invariant feature transform (SIFT), and the like.

Figure 3A:
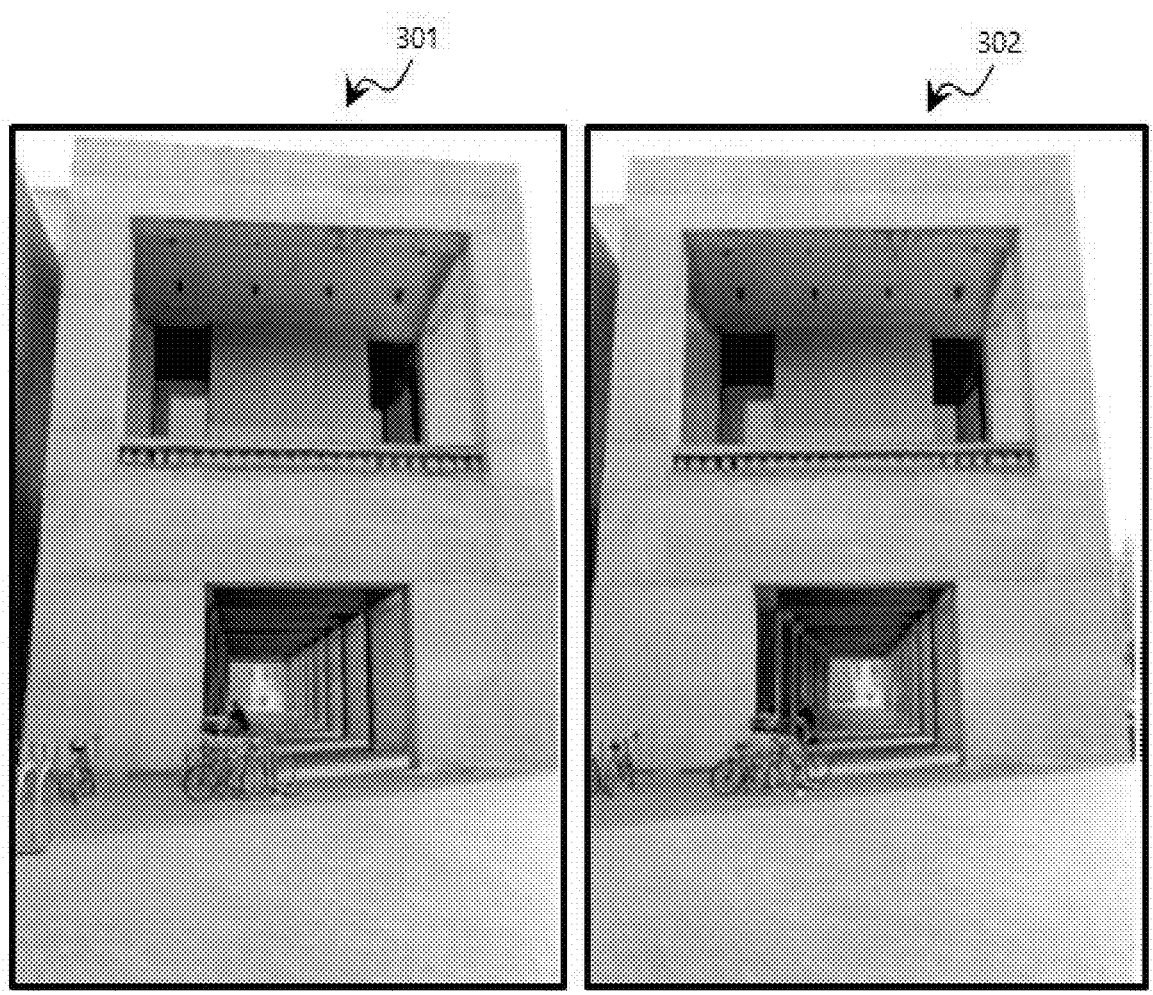
FIG. 3A illustrates an input image into a feature point detection apparatus according to another embodiment of the present disclosure.
Figure 3B:
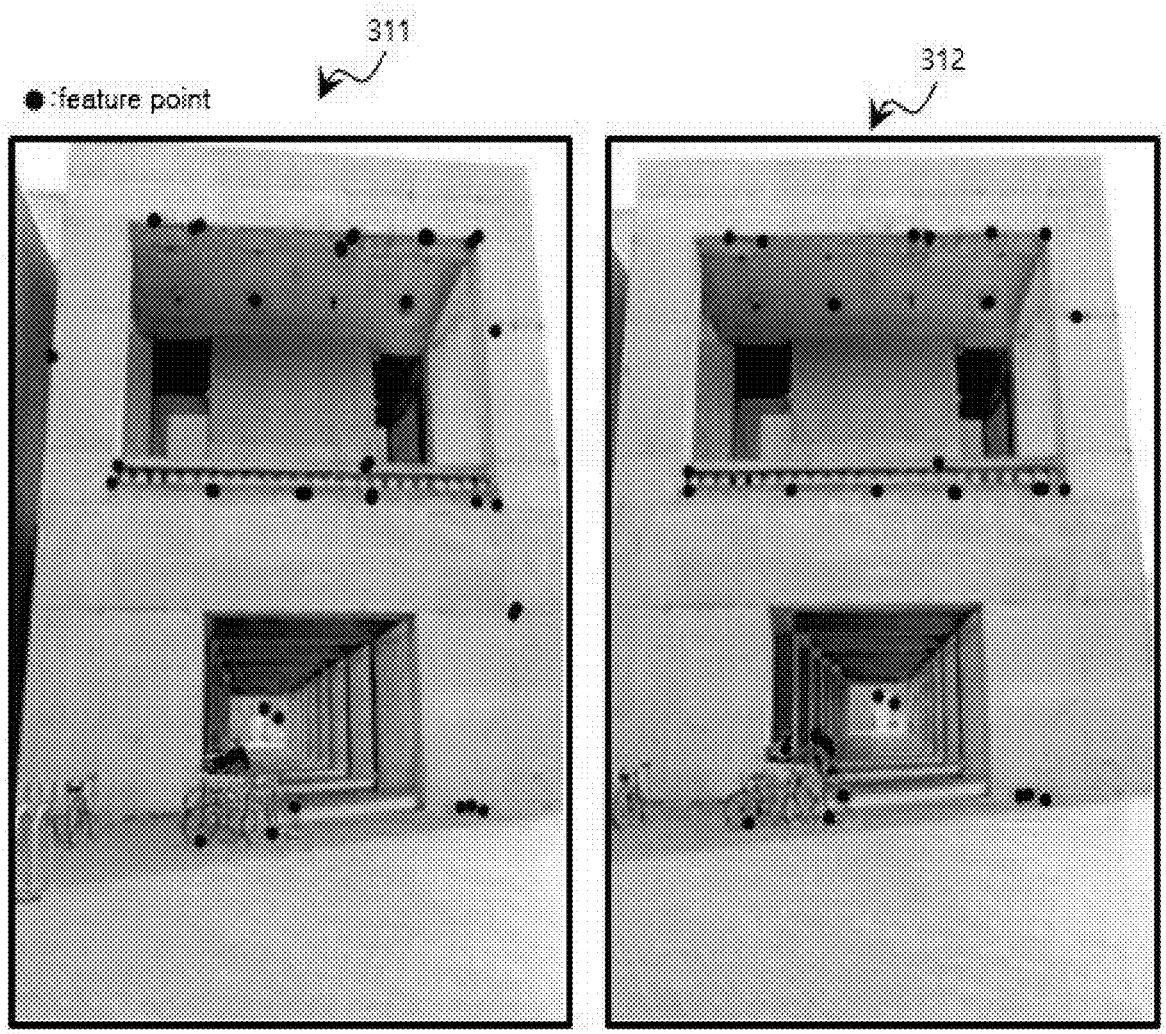
FIG. 3B illustrates comparative example images detected through a feature point detection apparatus according to another embodiment of the present disclosure.
Figure 3C:
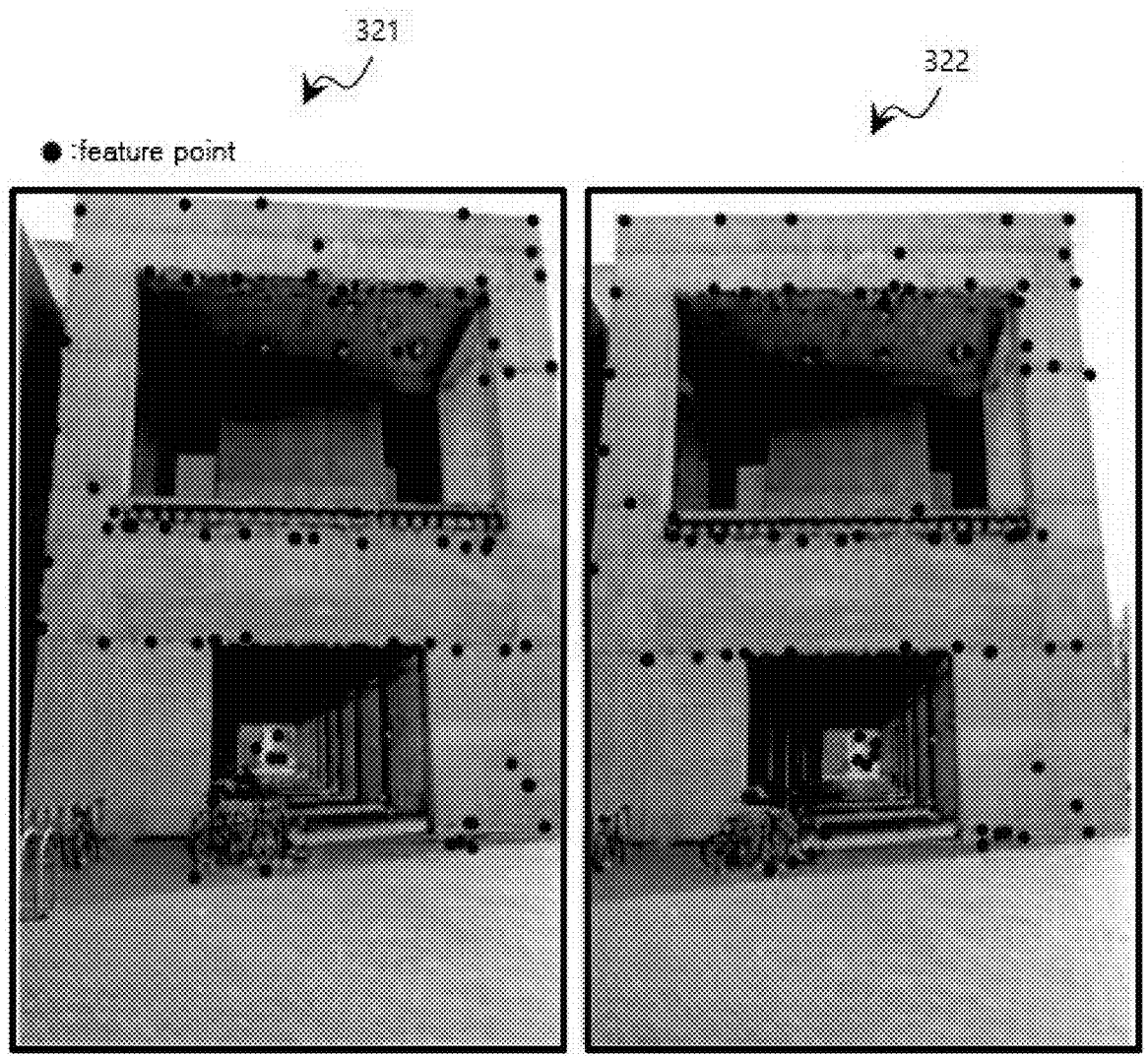
FIG. 3C illustrates exemplary images detected through a feature point detection apparatus according to another embodiment of the present disclosure.

FIG. 3A illustrates an input image into a feature point detection apparatus according to another embodiment of the present disclosure; FIG. 3B illustrates comparative example images detected through a feature point detection apparatus according to another embodiment of the present disclosure; and FIG. 3C illustrates exemplary images detected through a feature point detection apparatus according to another embodiment of the present disclosure.

The feature point detecting apparatus 200 according to another embodiment of the present disclosure receives Hall images having a resolution of 2000*3008 as input images 301 and 302, and inputs the input images 301 and 302 to the feature point detection unit 170 without performing a separate preprocessing operation through the transformation method selection unit 110, HE processing unit 130, the gamma transformation processing unit 150, and the like, thereby detecting the feature points, in which the detected feature points may be displayed as comparative example images 311 and 312.

In this case, the feature point detection unit 170 detects feature points of the input images 301 and 302 according to a speed-up robust features (SURF) algorithm and uses a normalized eight-point algorithm in order to identify Epipolar correspondences. In addition, the feature point detection unit 170 uses RANdom Sample Consensus (RANSAC) to remove the outline. As a result, the feature point detection unit 170 may detect 168.5 feature points as shown in the comparative examples images 311 and 312.

In addition, the feature point detecting apparatus 200 according to another embodiment of the present disclosure receives Hall images having a resolution of 2000*3008 as the input images 301 and 302, performs preprocessing for the input images 301 and 302 through a transformation method selection unit 110, a HE processing unit 130, and a gamma transformation processing unit 150, and then inputs the preprocessed input image to the feature point detection unit 170, thereby detecting the feature points, in which the detected feature points may be displayed as in the exemplary images 321 and 322.

Similarly, the feature point detection unit 170 detects feature points for the input images 301 and 302 according to a speed-up robust features (SURF) algorithm, and uses normalized eight-point algorithm to identify Epipolar correspondences. In addition, the feature point detection unit 170 uses RANdom Sample Consensus (RANSAC) to remove the outline. As a result, the feature point detection unit 170 may detect 800 feature points, as shown in the exemplary images 321 and 322. Comparing the comparative example images 311 and 312 and the exemplary images 321 and 322, it will be appreciated that remarkably more feature points are detected in the exemplary images 321 and 322 obtained by performing the preprocessing operation through the feature point detecting apparatus 200 according to another embodiment of the present disclosure compared to the comparative example images 311 and 312.

Figure 4:
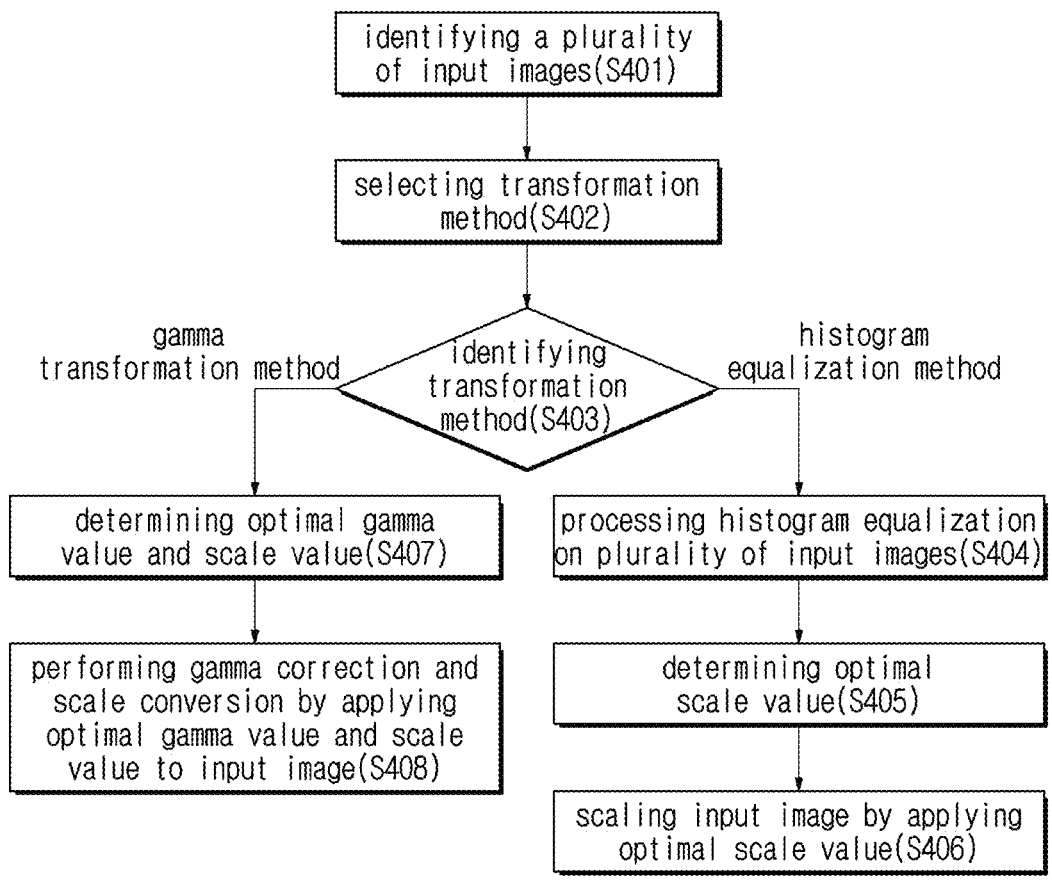
FIG. 4 is a flowchart illustrating a procedure of an image preprocessing method according to an embodiment of the present disclosure.

FIG. 4 is a flowchart illustrating a procedure of an image preprocessing method according to an embodiment of the present disclosure.

An image preprocessing method according to an embodiment of the present disclosure may be performed by the image preprocessing apparatus according to an embodiment of the present disclosure described above.

First, in step S401, the image preprocessing apparatus may identify a plurality of input images to process image registration. Here, the plurality of input images may include reference image, alignment image, and the like as described above.

In operation S402, the image preprocessing apparatus may select at least one transformation method among histogram equalization and gamma transformation in consideration of hue and brightness values of the plurality of input images.

Specifically, the image preprocessing apparatus may identify a hue value (Hue), a brightness value (Value), and the like of the input image for the selection of the transformation method, and the transformation method may be determined in consideration of the hue value (Hue), the brightness value (Value), and the like that are identified.

Preferably, the plurality of input images may include RGB model based color information, and the image preprocessing apparatus may transform the RGB model based input image into a HSV (Hue, Saturation, and Value) model.

In addition, the image preprocessing apparatus may analyze a histogram for the hue value and a histogram for the brightness values in the input image and determine a transformation method of the input image on the basis of the HV histogram.

Furthermore, the image preprocessing apparatus primarily estimates at least one transformation method on the basis of the hue histogram of the plurality of input images, and then secondly determine the transformation method in consideration of the brightness histogram of the plurality of input images on the basis of the estimated at least one transformation method. A detailed operation of determining the transformation method by the image preprocessing apparatus will be described in detail with reference to FIG. 5.

Meanwhile, in step S403, the image preprocessing apparatus may identify the determined transformation method. When the determined transformation method is a histogram equalization method, the process proceeds to step S404. When the determined transformation method is a gamma transformation method, the process proceeds to step S407.

In operation S404, the image preprocessing apparatus may process histogram equalization on the plurality of input images.

Subsequently, in operation S405, the image preprocessing apparatus may determine an optimal scale value by scaling the histogram equalized input image to various sizes, in which the optimal scale value may be preferably identified through the calculation of Equation 3 below.

$$s^* = \underset{a<s<b}{\mathrm{argmax}}\, f(s(I_1^{HE}), s(I_2^{HE}))$$ [Equation 3]

$I_1, I_2$: Input Images $I_1^{HE}, I_2^{HE}$: Input Image after HE $s(\ )$: Scaling Operator $a$ & $b$: Bounds for Scaling $f$: Feature Matching Function In step 406, the image preprocessing apparatus may scale and output the input image by applying the identified optimal scale value.

In step S407, the image preprocessing apparatus corrects the hue of the input image by changing the gamma value to various values simultaneously while scaling the input image of the corrected gamma value to various sizes, thereby determining the optimal value from the input images scaled to various sizes.

Preferably, the image preprocessing apparatus may determine an optimal gamma value and scale value through calculation of Equation 4 below.

$$s^{**}, y = \underset{\substack{a<s<b \\ c<y<d}}{\mathrm{argmax}}\, f\left(s\left(255 \times \left(\frac{I_1}{255.0}\right)^{\frac{1}{y}}\right), s\left(255 \times \left(\frac{I_2}{255.0}\right)^{\frac{1}{y}}\right)\right)$$ [Equation 4]

$I_1, I_2$: Input Images $s(\ )$: Scaling Operator $a$ & $b$: Bounds for Scaling $c$ & $d$: Bounds for $y$ $f$: Feature Matching Function In step S408, the image preprocessing apparatus may perform gamma correction and scale conversion on the input image by applying the optimal gamma value and optimal scale value determined in step S407 to the input image, and output the transformed input image.

Figure 5:
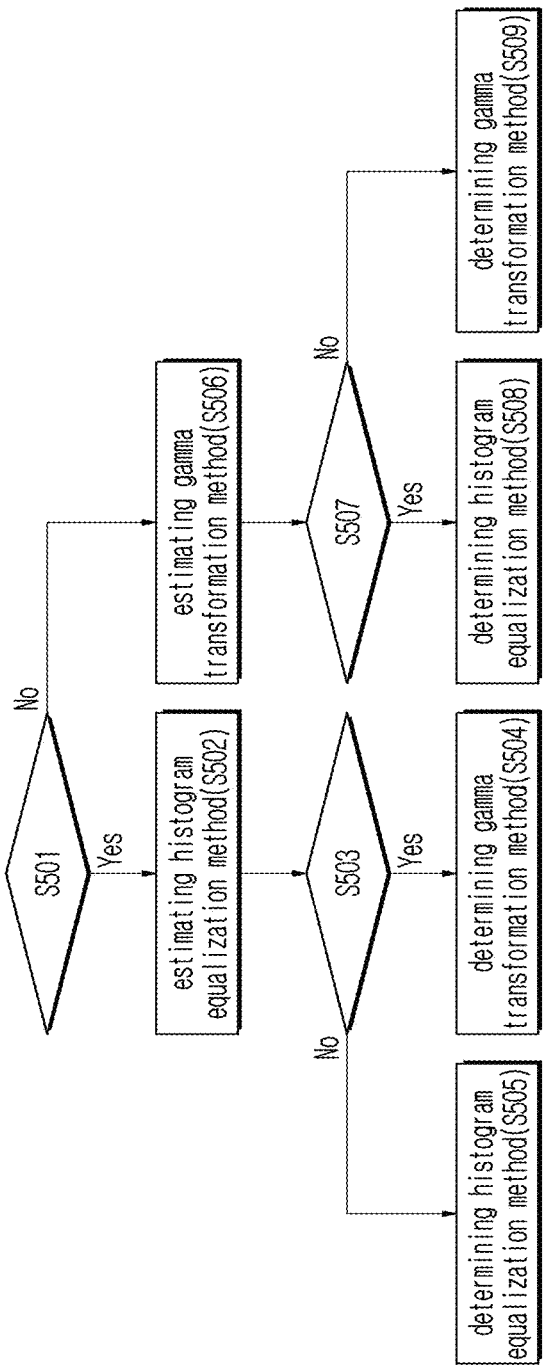
FIG. 5 is a flowchart illustrating a detailed procedure of determining a transformation method included in an image preprocessing method according to an embodiment of the present disclosure.
Figure 7A:
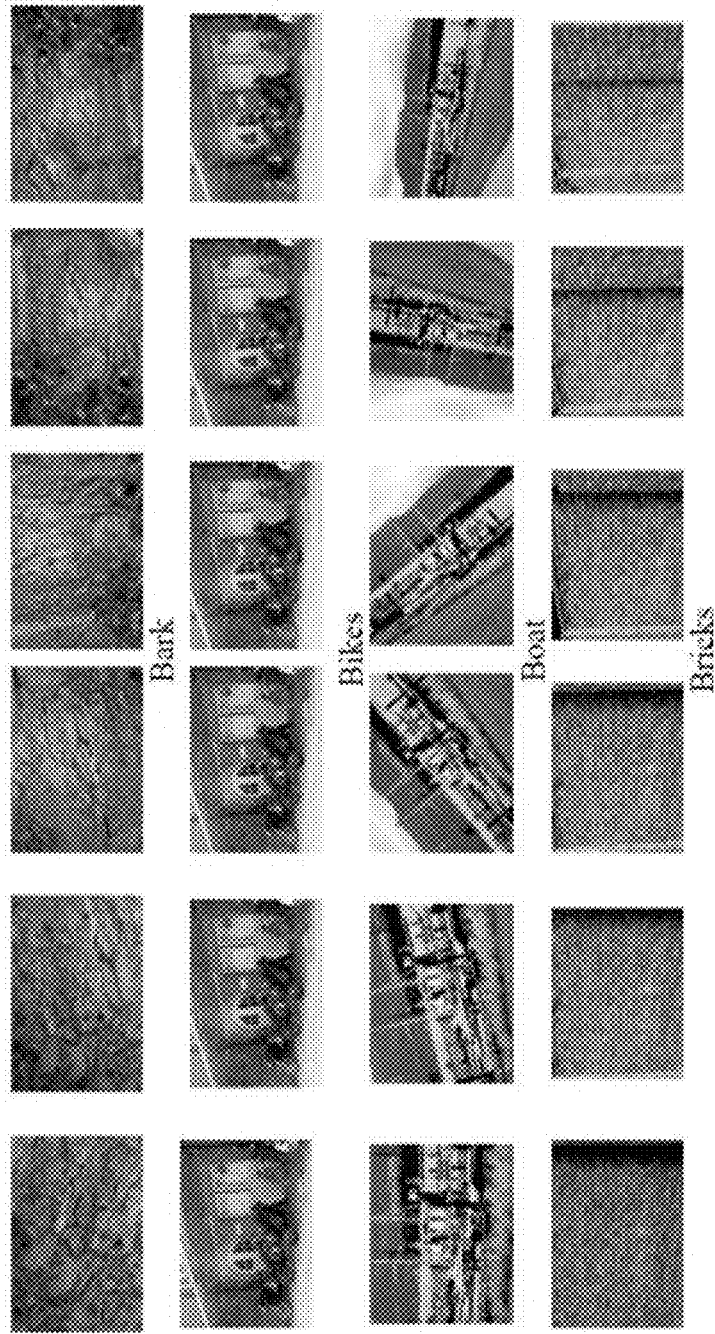
FIG. 7A to 7I are diagrams illustrating input images used in an exemplary example and a comparative example of an image preprocessing method according to an embodiment of the present disclosure.
Figure 7B:
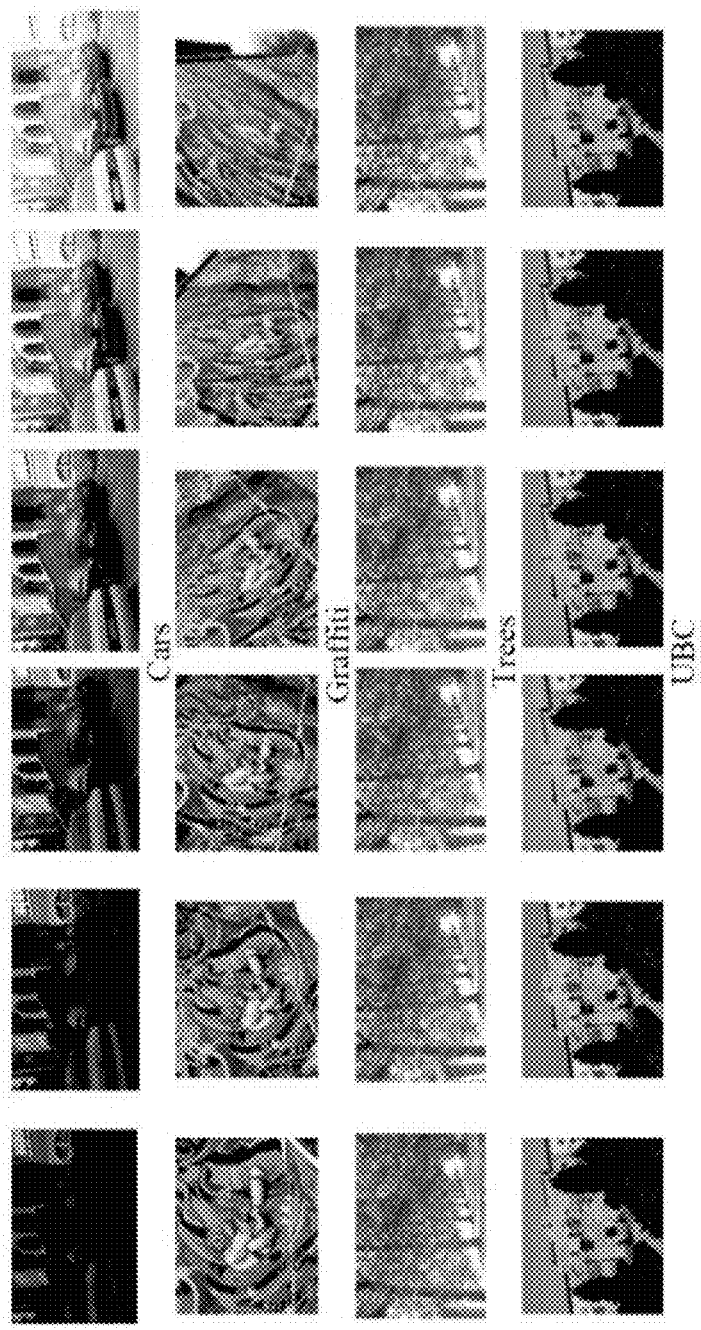
Figure 7C:
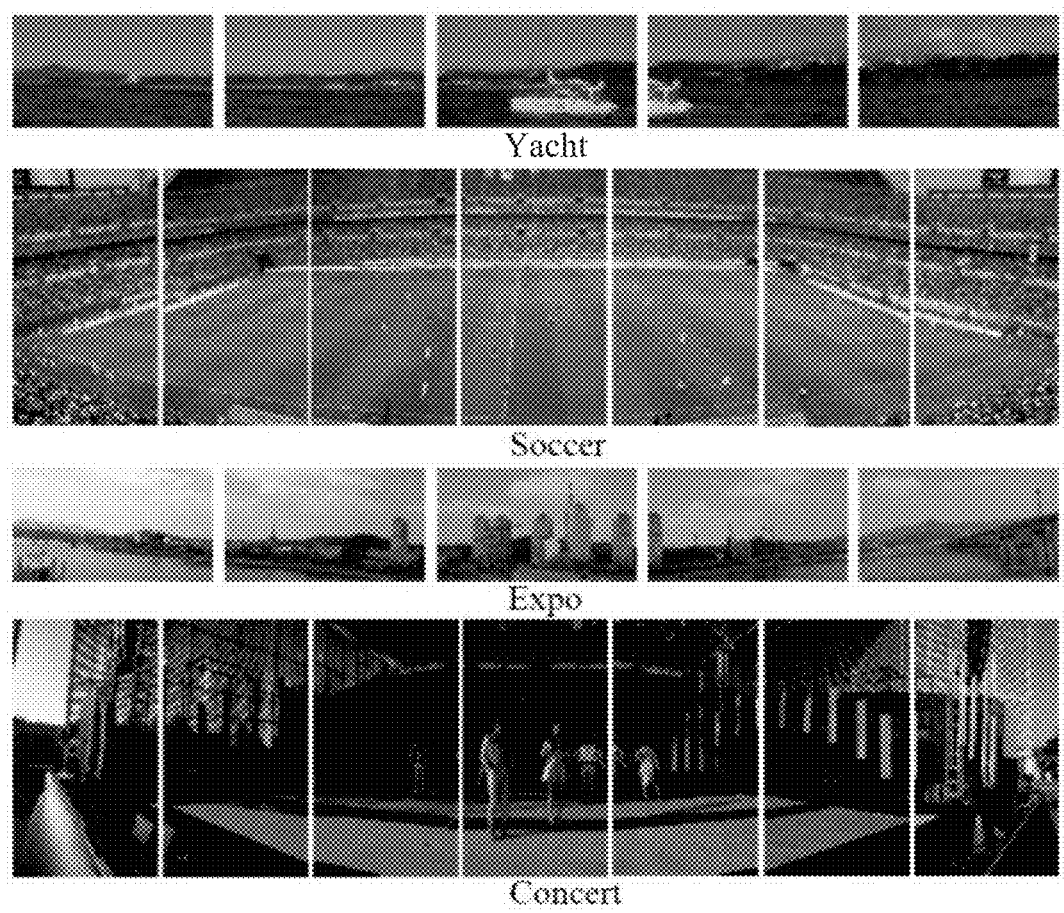
Figure 7D:
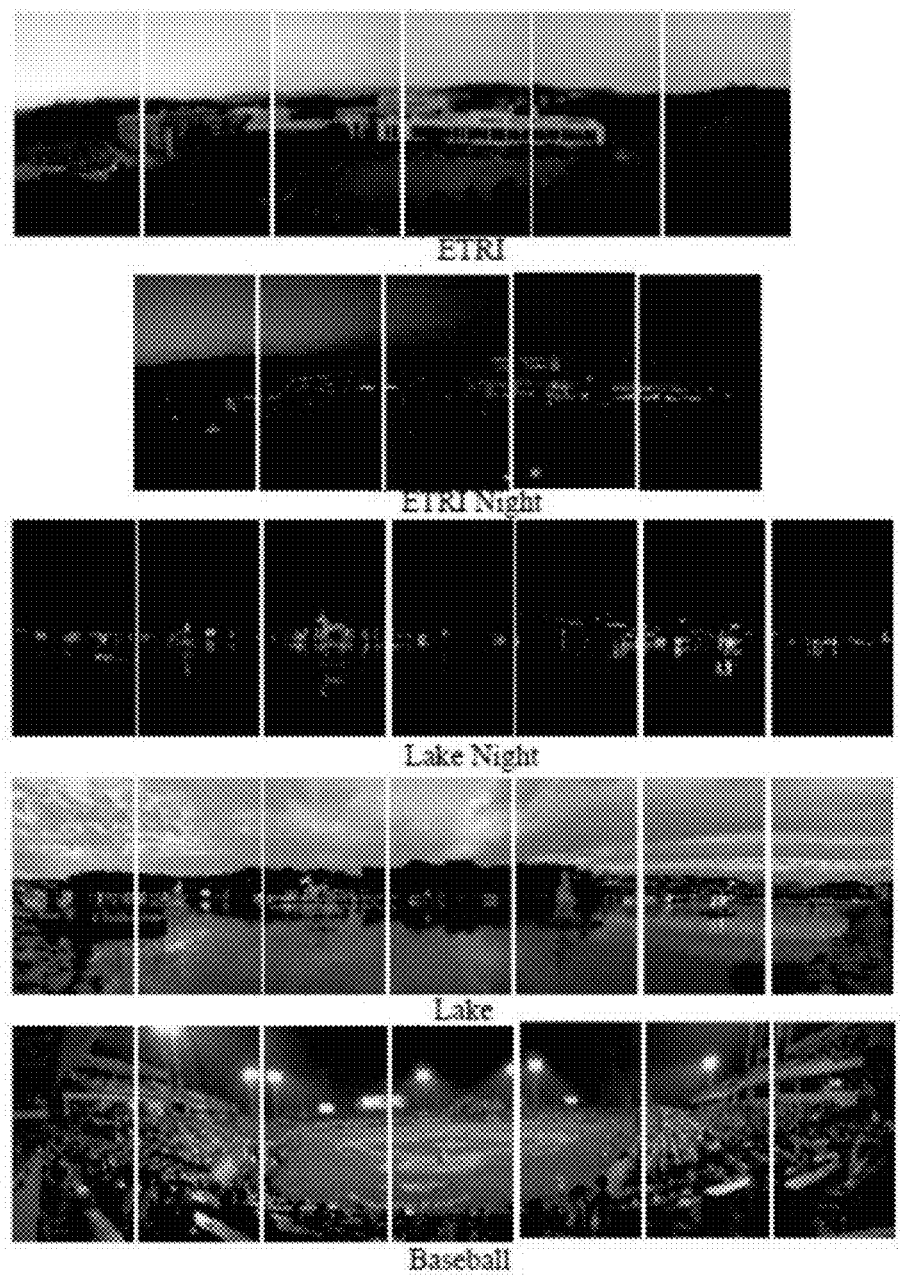
Figure 7E:
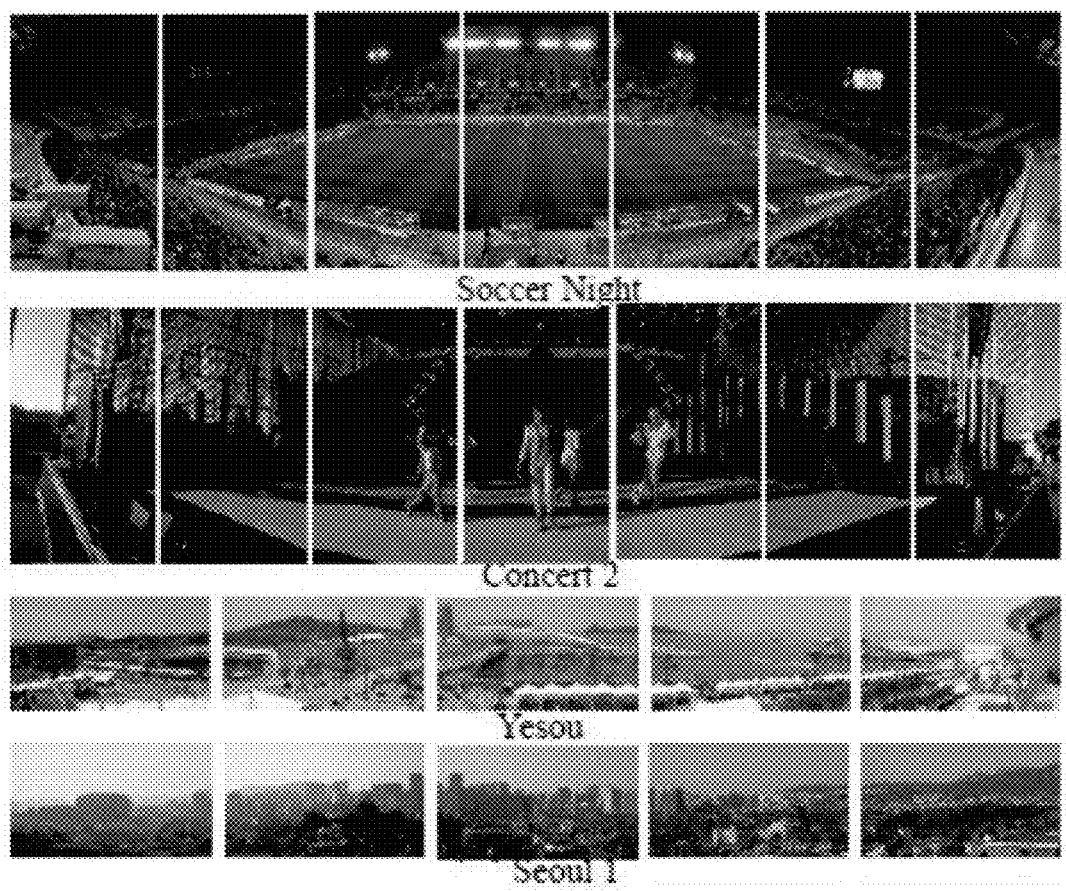
Figure 7F:
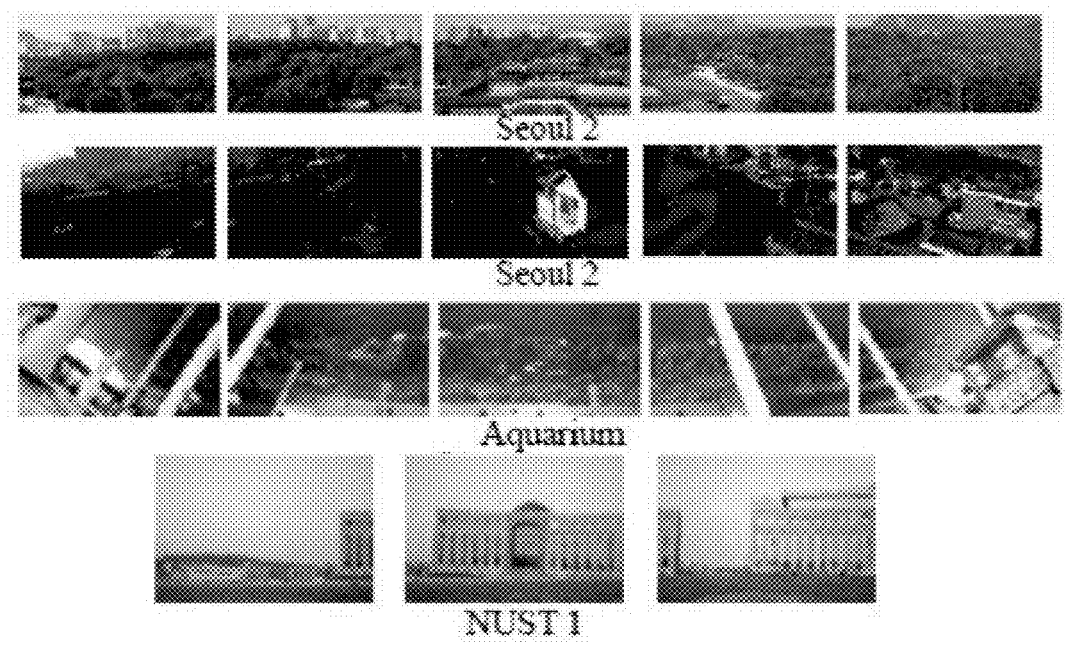
Figure 7G:
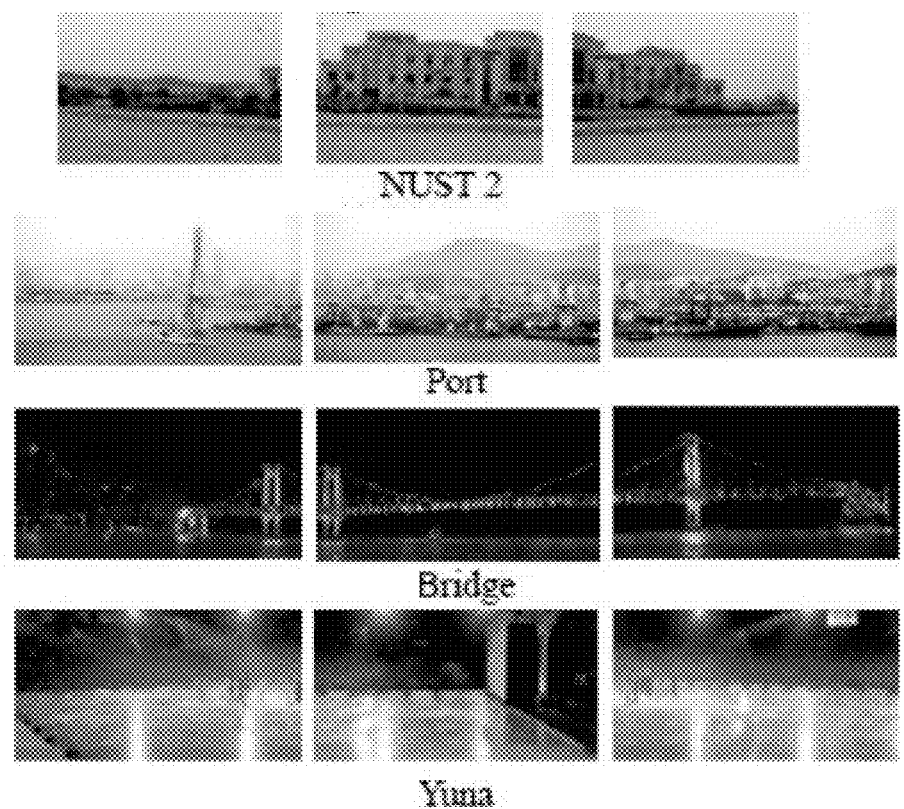
Figure 7H:
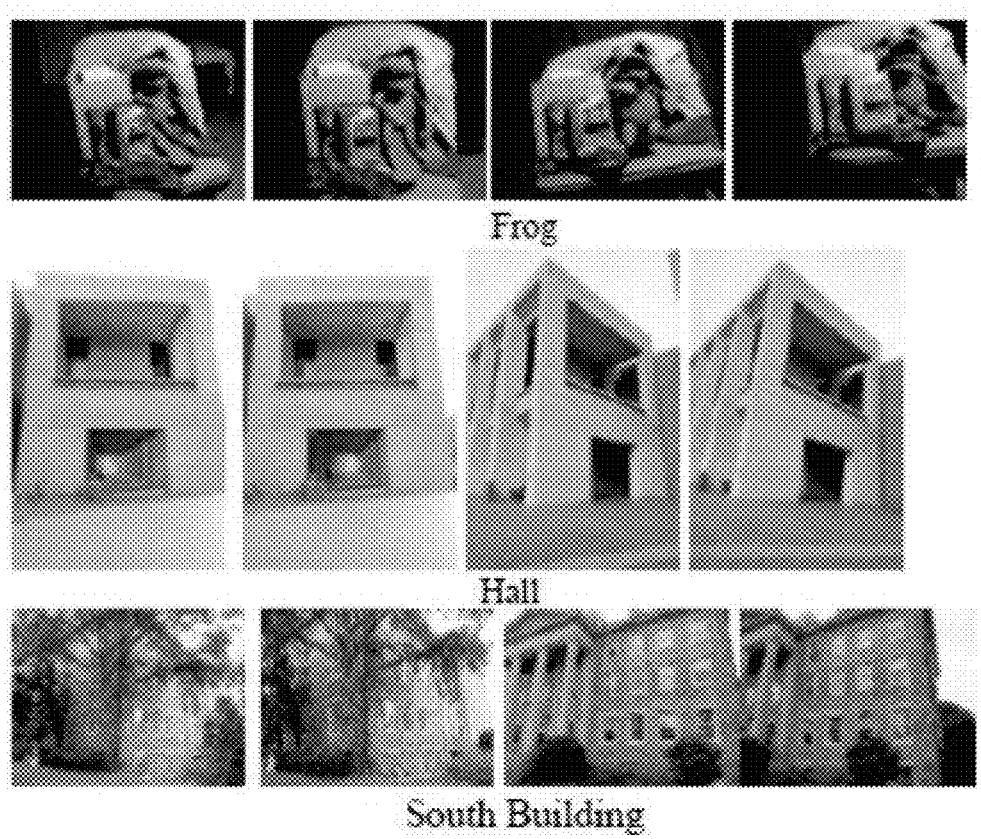
Figure 7I:
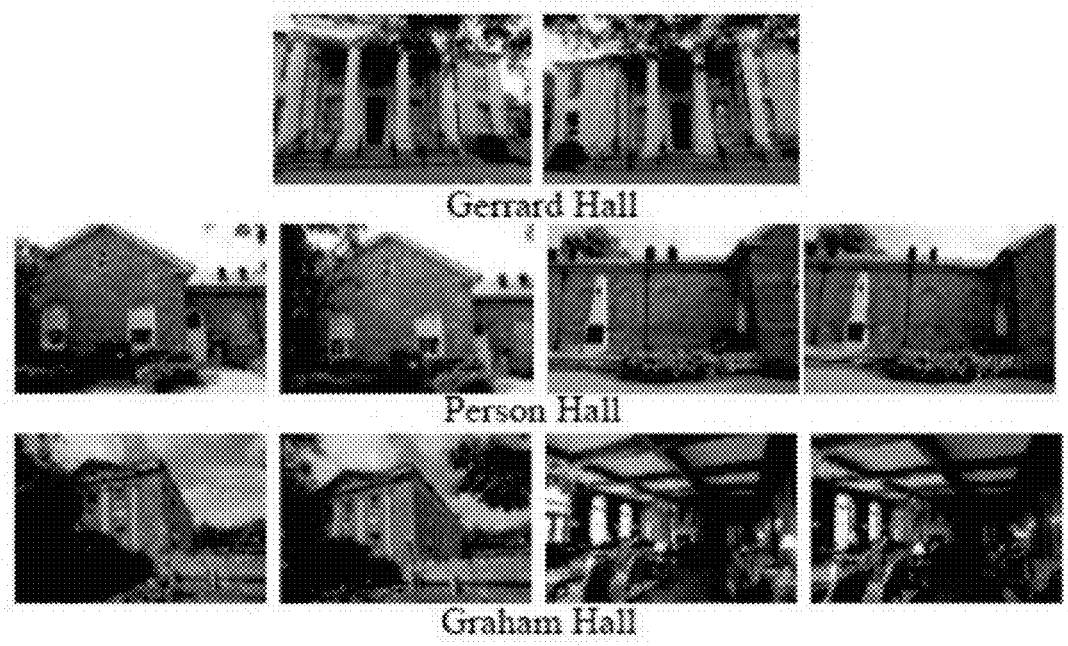

FIG. 5 is a flowchart illustrating a detailed procedure of determining a transformation method included in an image preprocessing method according to an embodiment of the present disclosure.

In step S501, the image preprocessing apparatus may determine the transformation method by performing operation of the program code illustrated in Table 2 below. In Table 2, the image preprocessing apparatus determines the transformation method using two input images, that is, the first input image Image 1 and the second input image Image 2, but the present disclosure is not limited thereto. The number of input images may be variously changed on the basis of the image registration methods.

TABLE 2

| Definitions: | |
|---|---|
| $H_1$: | Histogram of H Component of Image 1 |
| $H_2$: | Histogram of H Component of Image 2 |
| $V_1$: | Histogram of V Component of Image 1 |
| $V_2$: | Histogram of V Component of Image 2 |
| $P\_H_1$: | Highest Peak of $H_1$ |
| $P\_H_2$: | Highest Peak of $H_2$ |
| $P\_V_1$: | Highest Peak of $V_1$ |
| $P\_V_2$: | Highest Peak of $V_2$ |

```
Output: HE or γ
Step I (Initial Guess):
if P_H₁ <= 140° and P_H₂ <= 140°
        Decision: γ
else
        Decision: HE
end
Step II (Final Decision):
if Decision == γ                                                              ⎤
    if (P_V₁ <= 0.3 and P_V₂ >= 0.7) OR ((P_V₁ >= 0.7 and P_V₂ <= 0.3)) ⊢ Intensity different
between
        Decision = HE                                                         | images is very high.
    end                                                                       ⎦
    else Decision = HE                                                        ⎤
```

TABLE 2-continued

```
    if P_V₁ >= 0.7 and P_V₂ >= 0.7        ⊢ Images are very bright
        Decision == γ                      |
    end                                    ⌋
end
Output = Decision
```

In step S501, the image preprocessing apparatus identifies whether both hue values of the first input image Image 1 and the second input image Image 2 represent a value less than or equal to a predetermined threshold (e.g., 140°). When both the hue values of the first input image Image 1 and the second input image Image 2 represent values less than or equal to the predetermined threshold (e.g., 140°) (S501—Yes), the image preprocessing apparatus proceeds to step S502, thereby estimating a histogram equalization method.

When the estimated transformation method is the histogram equalization method, the image preprocessing apparatus may determine whether brightness values of the first input image and the second input image are greater than or equal to a predetermined threshold (e.g., 0.7) (S503).

When the brightness values of the first input image and the second input image are equal to or greater than the predetermined threshold (e.g., 0.7) (S503—Yes), the image preprocessing apparatus may determine the transformation method as a gamma transformation method (S504), whereas when the brightness values of the first input image and the second input image are not equal to or greater than the predetermined threshold (e.g., 0.7) (S503—No), that is, when at least one of the brightness values of the first input image and the second input image is less than the predetermined threshold (e.g., 0.7), the image preprocessing apparatus may determine a histogram equalization method for the transformation method (S505).

Meanwhile, when both the hue values of the first input image Image 1 and the second input image Image 2 are not less than or equal to a predetermined threshold (e.g., 140°) (S501—No), that is, when at least one of the hue values of the first input image and the second input image exceeds the predetermined threshold (e.g., 140°), the image preprocessing apparatus may proceed to step S506, thereby estimating a gamma transformation method.

Thereafter, the image preprocessing apparatus may determine a gamma transformation method or a histogram equalization method by identifying a difference in brightness between the first input image and the second input image.

In detail, in step S507, the image preprocessing apparatus may identify whether a brightness value of the first input image less than or equal to a predetermined first brightness value (0.3) and a brightness value of the second input image is equal to or greater than a predetermined second brightness value (0.7), or whether the brightness value of the first input image is equal to or greater than the predetermined second brightness value (0.7) and the brightness value of the second input image is less than or equal to the predetermined first brightness value (0.3).

When the brightness value of the first input image is equal to or less than the first predetermined brightness value (0.3) and the brightness value of the second input image is greater than or equal to the predetermined second brightness value (0.7), or when the brightness value of the first input image is equal to or greater than a predetermined second brightness value (0.7) and the brightness value of the second input image is less than or equal to the predetermined first brightness value (0.3) (S507—Yes), the image preprocessing apparatus may determine a histogram equalization method for the transformation method (S508).

Meanwhile, the condition of step S507 (the brightness value of the first input image is equal to or less than the first predetermined brightness value (0.3) and the brightness value of the second input image is greater than or equal to the predetermined second brightness value (0.7), or the brightness value of the first input image is equal to or greater than a predetermined second brightness value (0.7) and the brightness value of the second input image is less than or equal to the predetermined first brightness value (0.3)) is not satisfied (S507—No), the image preprocessing apparatus may determine a gamma transformation method for the transformation method (S509).

FIG. 6 is a diagram illustrating an exemplary example and a comparative example of an image preprocessing method according to an embodiment of the present disclosure.

In FIG. 6, an exemplary example 601 shows a proposed detection result of feature points from various input images preprocessed by the image preprocessing method according to an embodiment of the present disclosure, and a comparative example 605 shows an original detection result of feature points from the input image without additional preprocessing.

The types of input images in the exemplary example 601 and the comparative example 605 include 36 images illustrated in FIGS. 7A to 7I, that is, Bark, Bikes, Boat, Bricks, Cars, Graffiti, Trees, UBC, Yacht, Soccer, Expo, Concert, ETRI, ETRI Night, Lake Night, Lake, Baseball, Soccer Night, Concert 2, Yeosu, Seoul 1, Seoul 2, Seoul 3, Aquarium, NUST 1, NUST 2, Port, Bridge, Yuna, Frog, Hall, South Building, Gerrard Hall, Person Hall, and Graham Hall.

In FIG. 6, the image size of the input image represents a size of an image resolution, and the performance improvement level represents a ratio of the number of feature points of the exemplary example to the number of feature points of the comparative example of each input image.

A speed-up robust features (SURF) algorithm is used as an algorithm for identifying the number of matched feature points, and a normalized eight point algorithm is used in order to identify Epipolar correspondences on a plurality of input images. In addition, a random sample consensus (RANSAC) is used to obtain the fundamental matrix and to remove the outlier that contributes to improve the accuracy of Epipolar correspondences.

Again, referring to FIG. 6, it can be seen that the exemplary example 601 detects a relatively large number of feature points compared to the comparative example 605, and obtains 175% performance improvement compared to the comparative example 605 on average.

Figure 8:
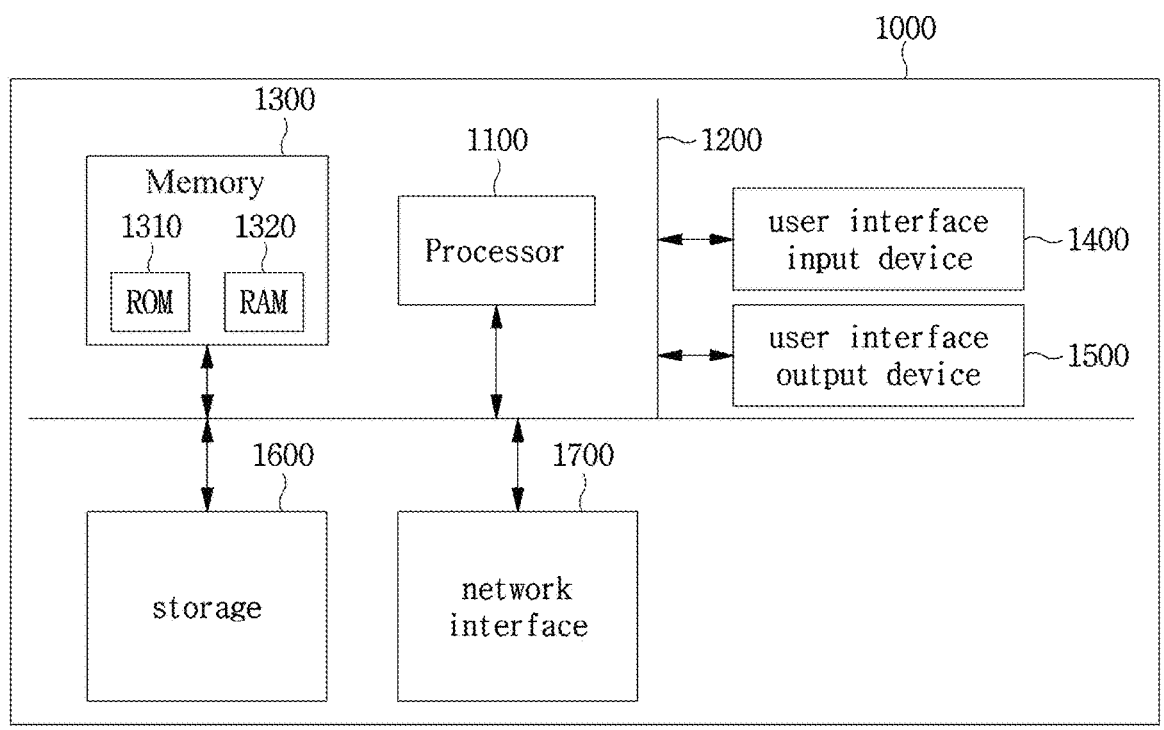
FIG. 8 is a block diagram illustrating a computing system executing an image preprocessing method and apparatus according to an embodiment of the present disclosure.

FIG. 8 is a block diagram illustrating a computing system executing an image preprocessing method and apparatus according to an embodiment of the present disclosure.

Referring to FIG. 8, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method for image preprocessing, the method comprising:
    identifying a plurality of input images to process image registration;
    selecting either histogram equalization or gamma transformation as transformation method alternatives based upon hue and brightness values of the plurality of input images;
    processing the histogram equalization on the plurality of input images, in response to the histogram equalization method being selected; and
    processing the gamma transformation on the plurality of input images, in response to the gamma transformation method being selected.

2. The method of claim 1, wherein the processing of the histogram equalization includes:
    processing the histogram equalization on the plurality of input images; and
    converting the plurality of input images undergoing the histogram equalization into various sizes to identify an optimized size value.

3. The method of claim 1, wherein the processing of the gamma transformation includes:
    Inverting the plurality of input images into various sizes;
    processing the gamma transformation on the plurality of input images converted into various sizes; and
    identifying an optimized size value of the plurality of input images.

4. The method of claim 1, wherein the selecting of transformation method alternatives includes:
    determining the transformation method alternatives on the basis of the hue values of the plurality of input images; and
    determining the transformation method alternatives in consideration of the brightness values of the plurality of input images on the basis of the transformation method alternatives involving the hue values of the plurality of input images.

5. The method of claim 1, wherein the selecting of the transformation method alternatives includes: transforming the plurality of input images into an HSV (Hue, Saturation, and Value) model.

6. The method of claim 5, wherein the selecting of the transformation method alternatives includes:
    identifying whether each of the hue values of each of the plurality of input images represent a value less than or equal to a predetermined hue threshold; and
    determining the histogram equalization method when all of the hue values of each of the plurality of input images are less than or equal to the predetermined hue threshold, and determining the gamma transformation method when all of the hue values of each of the plurality of input images are not less than or equal to the predetermined hue threshold.

7. The method of claim 6, wherein the selecting of the transformation method alternatives includes: in response to the gamma transformation method being determined, determining the histogram equalization method, when a brightness value of a first input image included in the plurality of input images is equal to or less than a predetermined first brightness value, and a brightness value of a second input image included in the plurality of input images is equal to or greater than a predetermined second brightness value, or the brightness value of the first input image is greater than or equal to the second predetermined brightness value, and the brightness value of the second input image is less than or equal to the predetermined first brightness value.

8. The method of claim 6, wherein the selecting of the transformation method alternatives includes: in response to the gamma transformation method being determined, determining the histogram equalization method when a difference in brightness values of the plurality of input images is equal to or greater than a predetermined brightness difference threshold.

9. The method of claim 6, wherein the selecting of the transformation method alternatives includes: in response to the histogram equalization method being determined, determining the gamma transformation method when the brightness values of the plurality of input images are all equal to or greater than a predetermined brightness threshold.

10. An apparatus for image preprocessing, the apparatus comprising:
  a transformation method selection unit identifying a plurality of input images to process image registration, selecting either histogram equalization or gamma transformation as transformation method alternatives based upon hue and brightness values of the plurality of input images, and providing the selected transformation method alternative;
  an HE processing unit processing the histogram equalization on the plurality of input images, in response to the histogram equalization method being selected; and
  a gamma transformation processing unit processing the gamma transformation on the plurality of input images.

11. The apparatus of claim 10, wherein the HE processing unit, processes the histogram equalization on the plurality of input images; and converts the plurality of input images undergoing histogram equalization into various sizes to identify an optimized size value.

12. The apparatus of claim 10, wherein the gamma transformation processing unit, converts the plurality of input images into various sizes, processes the gamma transformation on the plurality of input images converted into various sizes, and identifies an optimized size values for the plurality of input images.

13. The apparatus of claim 10, wherein the transformation method selection unit, determines the transformation method alternatives on the basis of the hue values of the plurality of input images, and determines the transformation method alternatives in consideration of the brightness values of the plurality of input images on the basis of the transformation method alternative involving the hue values of the plurality of input images.

14. The apparatus of claim 10, wherein the transformation method selection unit transform the plurality of input images into an HSV (Hue, Saturation, and Value) model.

15. The apparatus of claim 14, wherein the transformation method selection unit:
  identifies whether each of the hue values of each of the plurality of input images represent a value less than or equal to a predetermined hue threshold; and
  determines the histogram equalization method when all of the hue values of each of the plurality of input images are less than or equal to the predetermined hue threshold, and the gamma transformation method when all of the hue values of each of the plurality of input images are not less than or equal to the predetermined hue threshold.

16. The apparatus of claim 15, wherein the transformation method selection unit, in response to the gamma transformation method being determined, determines the histogram equalization method, when a brightness value of a first input image included in the plurality of input images is equal to or less than a predetermined first brightness value, and a brightness value of a second input image included in the plurality of input images is equal to or greater than a predetermined second brightness value, or the brightness value of the first input image is greater than or equal to the second predetermined brightness value, and the brightness value of the second input image is less than or equal to the predetermined first brightness value.

17. The apparatus of claim 15, wherein the transformation method selection unit, in response to the gamma transformation method being determined, determines the histogram equalization method when a difference in brightness values of the plurality of input images is equal to or greater than a predetermined brightness difference threshold.

18. The apparatus of claim 15, wherein the transformation method selection unit, in response to the histogram equalization method being determined, determines the gamma transformation method when all the brightness values of the plurality of input images are equal to or greater than a predetermined brightness threshold.

* * * * *